United States Patent
Ono (10) Patent No.: US 8,390,750 B2
(45) Date of Patent: Mar. 5, 2013

(54) LIQUID CRYSTAL DISPLAY DEVICE

(75) Inventor: Kikuo Ono, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 640 days.

(21) Appl. No.: 12/553,134

(22) Filed: Sep. 3, 2009

(65) Prior Publication Data

US 2010/0053484 A1    Mar. 4, 2010

(30) Foreign Application Priority Data

Sep. 4, 2008  (JP) .................................. 2008-226646

(51) Int. Cl.
*G09G 3/36* (2006.01)
*G02F 1/1368* (2006.01)
*G02F 1/1343* (2006.01)

(52) U.S. Cl. ............ 349/37; 349/48; 349/141; 349/144; 345/89; 345/92; 345/690

(58) Field of Classification Search ............... 349/37, 349/48, 141, 143, 144; 345/87, 89, 92, 98, 345/204, 690
See application file for complete search history.

(56) References Cited

U.S. PATENT DOCUMENTS

| | | | |
|---|---|---|---|
| 2003/0090448 A1* | 5/2003 | Tsumura et al. ................ | 345/87 |
| 2006/0061723 A1* | 3/2006 | Mori et al. .................... | 349/141 |
| 2007/0080370 A1* | 4/2007 | Miyachi et al. ............... | 257/107 |
| 2007/0126969 A1* | 6/2007 | Kimura et al. ................ | 349/141 |

FOREIGN PATENT DOCUMENTS

WO    WO 01/18597 A1    9/2000

* cited by examiner

*Primary Examiner* — Uyen Chau N Le
*Assistant Examiner* — Michael Mooney
(74) *Attorney, Agent, or Firm* — Antonelli, Terry, Stout & Kraus, LLP.

(57) ABSTRACT

In a liquid crystal display device where pixel electrodes and counter electrodes are arranged on one substrate in a stacked manner by way of an insulation layer, it is possible to lower a drive voltage while maintaining optical transmissivity. Pixels each of which includes a first pixel electrode, a second pixel electrode and a counter electrode are arranged on a substrate in a matrix array. A first pixel electrode and a second pixel electrode in one pixel include a plurality of comb-teeth portions respectively. The first pixel electrode and the second pixel electrode are alternately arranged on the same layer in an opposed manner with a gap defined between the comb-teeth portion of the first pixel electrode and the comb-teeth portion of the second pixel electrode. The first and second pixel electrodes and the counter electrode are arranged in a stacked manner with an insulation layer sandwiched therebetween.

12 Claims, 6 Drawing Sheets

LIQUID CRYSTAL DISPLAY DEVICE

The present application claims priority from Japanese application JP2008-226646 filed on Sep. 4, 2008, the content of which is hereby incorporated by reference into this application.

BACKGROUND OF THE INVENTION

1. Field of the Invention

The present invention relates to a liquid crystal display device, and more particularly to a technique which is effectively applicable to a lateral-electric-field-drive liquid crystal display device such as an IPS drive liquid crystal display device.

2. Description of the Related Art

Conventionally, with respect to an active-matrix-type liquid crystal display device, there has been known a liquid crystal display device which includes a lateral-electric-field drive liquid crystal display panel such as an IPS-drive liquid crystal display panel. The lateral-electric-field drive liquid crystal display panel includes a first substrate, a second substrate and liquid crystal sealed (sandwiched) between both substrates, and pixel electrodes and counter electrodes (common electrodes) which control intensities of electric fields applied to a liquid crystal material are arranged on one of these substrates, for example, on the first substrate.

Further, the IPS-drive liquid crystal display panel is classified into a liquid crystal display panel where pixel electrodes and counter electrodes are arranged in an opposed manner on the same surface of an insulation layer, and a liquid crystal display panel where pixel electrodes and counter electrodes are arranged in a stacked manner with an insulation layer sandwiched therebetween.

In the IPS-drive liquid crystal display panel where the pixel electrodes and the counter electrodes are arranged in a stacked manner with the insulation layer sandwiched therebetween, usually, the pixel electrodes are arranged between the counter electrodes and the liquid crystal material. In such arrangement, the pixel electrode has a planar shape in which a plurality of slits is formed, for example. Lines of force of an electric field (that is, lines of electric force) which are generated due to a potential difference between the pixel electrode and the counter electrode pass through the liquid crystal material on a way thereof advancing toward the counter electrode from the pixel electrode or on a way thereof advancing toward the pixel electrode from the counter electrode (see WO01/018597 (patent document 1), for example).

The liquid crystal display device having the IPS-drive liquid crystal display panel is characterized by a wide viewing angle compared to a liquid crystal display device having a vertical-electric-field drive liquid crystal display panel such as a VA-type liquid crystal display panel or a TN-type liquid crystal display panel. For example, the liquid crystal display device having the IPS-drive liquid crystal display panel has been popularly used in liquid crystal television receiver sets. Further, recently, the liquid crystal display device having the IPS-drive liquid crystal display panel has been also used as a display part of portable electronic equipment such as a mobile phone terminal, for example.

SUMMARY OF THE INVENTION

Recently, the reduction of power consumption has been steadily advancing with respect to a liquid crystal display device (also referred to as a liquid crystal display module) which is used as a display part of a liquid crystal television receiver set, a mobile phone terminal or the like. As a method for reducing power consumption of the liquid crystal display device, there has been known a method which lowers a drive voltage for driving a liquid crystal material, for example.

However, in case of the conventional liquid crystal display panel which uses a liquid crystal material, when a drive voltage for driving a liquid crystal material is simply lowered, intensity of an electric field is lowered thus giving rise to a drawback that optical transmissivity is lowered, for example. Accordingly, in lowering the drive voltage for driving the liquid crystal material, it is necessary to newly develop a liquid crystal material which has low viscosity so as to sensitively respond to a change of intensity of the electric field corresponding to lowering of the drive voltage.

Particularly, with respect to the IPS-drive liquid crystal display panel where the pixel electrodes and the counter electrodes are arranged in a stacked manner by way of the insulation layer, an electric field which drives liquid crystal molecules in the liquid crystal material is mainly applied to the liquid crystal material only in the vicinity of a first substrate on which the pixel electrodes and the counter electrodes are formed and hence, when the drive voltage is lowered, optical transmissivity is liable to be lowered.

It is an object of the present invention to provide a technique which can lower a drive voltage while maintaining optical transmissivity in a liquid crystal display device where pixel electrodes and counter electrodes are arranged on one substrate in a stacked manner by way of an insulation layer, for example.

The above-mentioned and other objects and novel features of the present invention will become apparent due to the description of this specification and attached drawings.

To briefly explain the typical inventions among inventions disclosed in this application, they are as follows.

(1) The present invention is directed to a liquid crystal display device which includes: a liquid crystal display panel which includes a first substrate, a second substrate, and liquid crystal material which is sealed between the first substrate and the second substrate; and a plurality of scanning signal lines and a plurality of video signal lines which are arranged on the first substrate, wherein pixels each of which includes a first TFT element, a first pixel electrode which is connected to a source of the first TFT element, a second TFT element, a second pixel electrode which is connected to a source of the second TFT element, and a counter electrode are arranged on the first substrate in a matrix array, a drain of the first TFT element and a drain of the second TFT element within the pixel are connected to the different video signal lines respectively, the first pixel electrode and the second pixel electrode have a planar shape and include a plurality of comb-teeth portions respectively, and the first pixel electrodes and the second pixel electrodes are arranged alternately on the same layer in an opposed manner with a gap defined between the comb-teeth portion of the first pixel electrode and the comb-teeth portion of the second pixel electrode, and the first and second pixel electrodes and the counter electrode are arranged in a stacked manner with the insulation layer sandwiched therebetween, and the first pixel electrode and the second pixel electrode are arranged between the counter electrode and the liquid crystal material.

(2) In the liquid crystal display device having the above-mentioned constitution (1), a level relationship between a potential of a grayscale voltage applied to the first pixel electrode and a potential of a voltage applied to the counter electrode during 1 frame period, and a level relationship between a potential of a grayscale voltage applied to the second pixel electrode and the potential of the voltage applied to the counter electrode during 1 frame period are reversed.

(3) In the liquid crystal display device having the above-mentioned constitution (1), the comb-teeth portions of the first pixel electrode and the comb-teeth portions of the second pixel electrode extend in the same direction, and the extending direction of the comb-teeth portions of the first pixel electrode and the comb-teeth portions of the second pixel electrode are parallel to neither the scanning signal line nor the video signal line.

(4) In the liquid crystal display device having the above-mentioned constitution (1), the counter electrode is formed in a rectangular shape within the pixel covering the substantially whole surface of the pixel.

(5) In the liquid crystal display device having the above-mentioned constitution (1), gaps which are formed between the plurality of comb-teeth portions of the first pixel electrode and the plurality of comb-teeth portions of the second pixel electrode are set equal.

According to the liquid crystal display device of the present invention, in the liquid crystal display device where pixel electrodes and counter electrodes are arranged on one substrate (first substrate) in a stacked manner by way of an insulation layer, it is possible to lower a drive voltage while maintaining optical transmissivity.

DESCRIPTION OF THE PREFERRED EMBODIMENT

Hereinafter, the present invention is explained in detail in conjunction with an embodiment by reference to the drawings.

Here, in all drawings for explaining the embodiment, parts having identical functions are given same symbols and their repeated explanation is omitted.

[Embodiment 1]

Figure 1A:
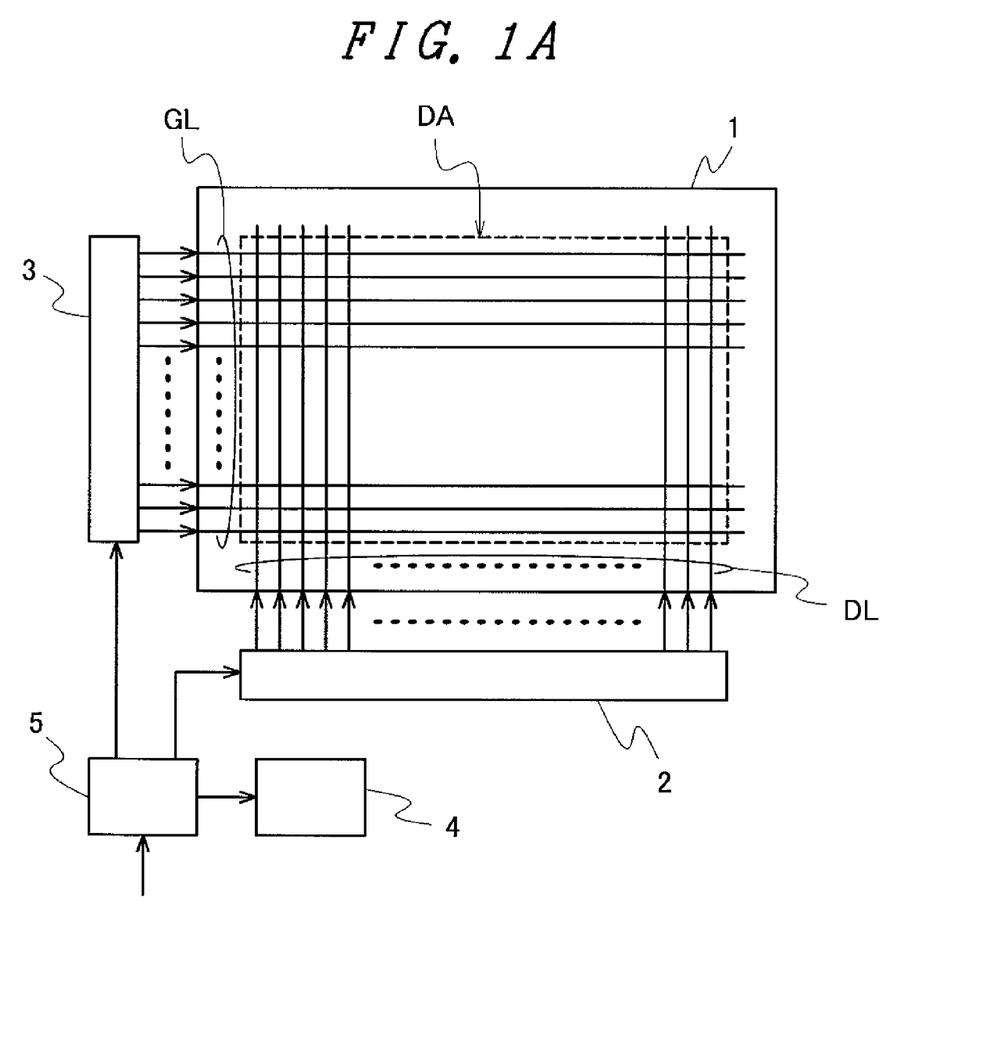
FIG. 1A is a schematic view showing one example of the overall constitution of a liquid crystal display device according to one embodiment of the present invention.
Figure 1B:
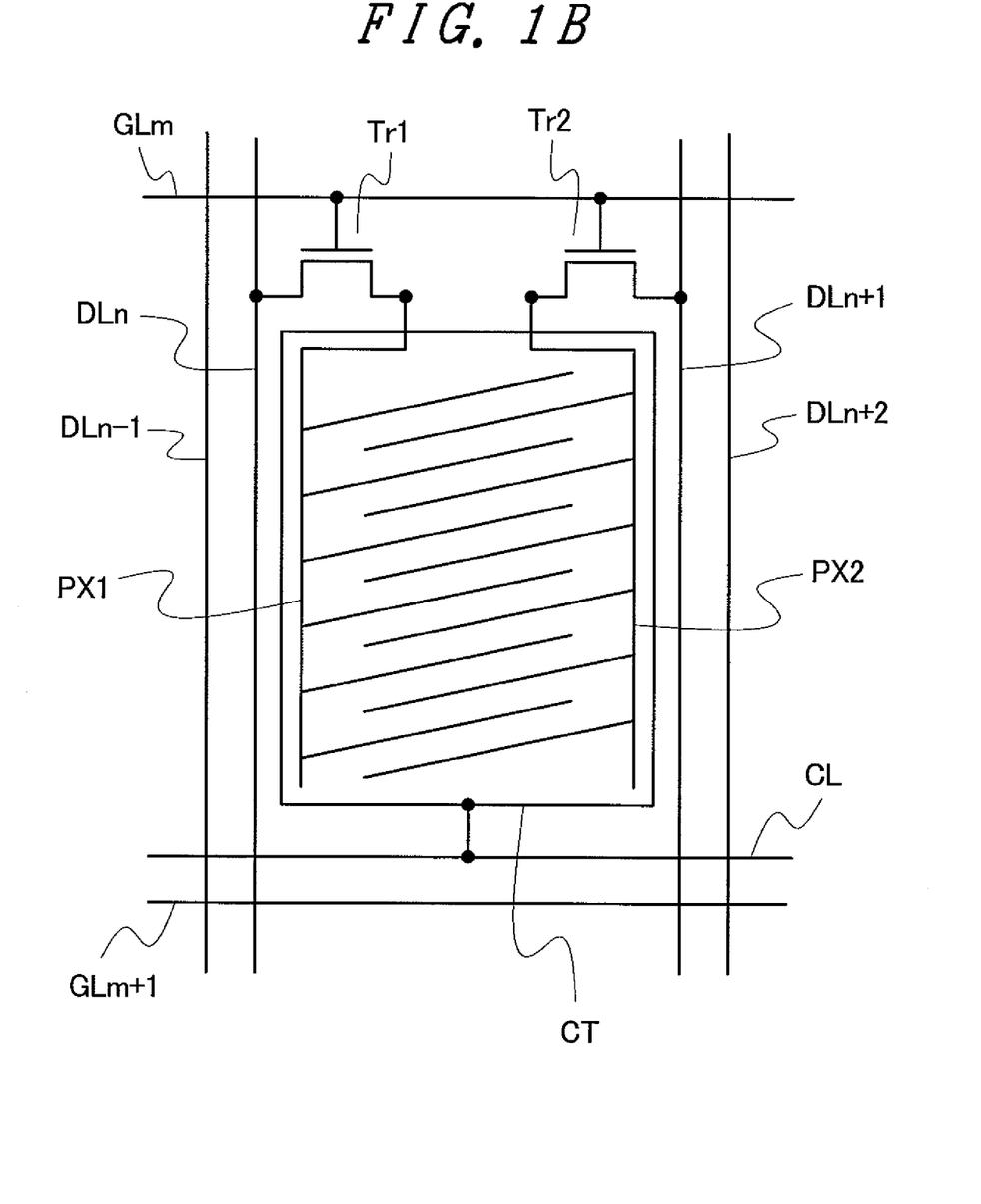
FIG. 1B is a schematic view showing one example of the circuit constitution of a pixel of a liquid crystal display panel of the liquid crystal display device of the embodiment.

FIG. 1A and FIG. 1B are schematic views showing one example of the overall constitution of a liquid crystal display device according to one embodiment of the present invention.

FIG. 1A is a schematic view showing one example of the schematic constitution of the liquid crystal display device according to one embodiment of the present invention. FIG. 1B is a schematic view showing one example of the circuit constitution of a pixel on a liquid crystal display panel of the liquid crystal display device of this embodiment.

As shown in FIG. 1A, the liquid crystal display device of this embodiment includes a liquid crystal display panel 1 which includes a plurality of scanning signal lines GL and a plurality of video signal lines DL, a first drive circuit 2 and a second drive circuit 3 for driving the liquid crystal display panel 1, a backlight 4, and a control circuit 5 which controls an operation of the first drive circuit 2, an operation of the second drive circuit 3 and an operation of the backlight 4, for example.

The liquid crystal display panel 1 is a display panel in which a liquid crystal material is sealed in a gap defined between a first substrate and a second substrate, and the plurality of scanning signal lines GL and the plurality of video signal lines DL are formed on the first substrate.

Here, in FIG. 1A, only some scanning signal lines GL out of the plurality of scanning signal lines GL are shown. In an actual liquid crystal display panel 1, however, a larger number of scanning signal lines GL are densely arranged. In the same manner, in FIG. 1A, only some video signal lines DL out of the plurality of video signal lines are shown. In an actual liquid crystal display panel 1, however, a larger number of video signal lines DL are densely arranged on the liquid crystal display panel 1.

A display region DA of the liquid crystal display panel 1 of this embodiment is constituted of a large number of pixels arranged in a matrix array. Here, for example, as shown in FIG. 1B, the pixels each of which includes a first TFT element Tr1, a first pixel electrode PX1 which is connected to a source of the first TFT element Tr1, a second TFT element Tr2, a second pixel electrode PX2 which is connected to a source of the second TFT element Tr2, and a counter electrode CT are arranged in a matrix array.

In such a constitution, in each pixel, a drain of the first TFT element Tr1 and a drain of the second TFT element Tr2 are connected to different video signal lines $DL_n$, $DL_{n+1}$ respectively. Accordingly, two video signal lines DL are arranged at a boundary portion defined between two pixels which are arranged adjacent to each other in the extending direction of the scanning signal lines GL. Here, a source and a drain of the first TFT element Tr1 and a source and a drain of the second TFT element Tr2 are exchanged corresponding to the direction of a bias, that is, corresponding to a level relationship between a potential of a grayscale voltage which is applied to a pixel electrode from the video signal line DL and a potential of the pixel electrode. In this specification, however, a terminal of the TFT element which is connected to the pixel electrode is referred to as a source.

A gate of the first TFT element Tr1 and a gate of the second TFT element Tr2 in each pixel are connected to the same scanning signal line $GL_m$.

Here, the first pixel electrode PX1 and the second pixel electrode PX2 are formed of an electrode having a plurality of slits therein respectively. The first pixel electrode PX1 and the second pixel electrode PX2 are arranged such that the slits of the first pixel electrode PX1 and the slits of the second pixel electrode PX2 are alternately arranged at predetermined intervals.

The counter electrode CT is connected to a common line CL which extends parallel to the scanning signal line GL, and the counter electrodes CT of the plurality of pixels which are arranged along the extending direction of the scanning signal line GL are connected in common to one common line CL.

The first drive circuit 2 is a drive circuit which generates a video signal (grayscale voltage) to be applied to the first pixel electrode PX1 and the second pixel electrode PX2 of each pixel via the video signal line DL. The first drive circuit 2 is generally referred to as a date driver, a source driver or the like. The second drive circuit 3 is a drive circuit which generates a scanning signal for selecting the pixel (the first pixel electrode PX1 or the second pixel electrode PX2) to which the video signal outputted to the video signal line DL from the first drive circuit 2 is applied. The second drive circuit 3 is generally referred to as a scanning driver, a gate driver or the like.

The first drive circuit 2 and the second drive circuit 3 are formed of an IC chip respectively, for example, and the first drive circuit 2 and the second drive circuit 3 are mounted on an outer peripheral portion of the liquid crystal display panel 1 (first substrate) or on a flexible printed circuit board which is connected to the outer peripheral portion of the liquid crystal display panel 1. Further, the first drive circuit 2 and the second drive circuit 3 may be formed on an outer peripheral portion of the first substrate respectively, for example, together with the first TFT elements Tr1 and the like which are formed within the display region DA, or may be incorporated into the first substrate.

The backlight 4 is a light emitting element such as a cold cathode fluorescent tube or a light emitting diode (LED), for example. Light emitted from the backlight 4 is converted into planar light beams via a light diffusion plate, a prism sheet or the like, for example, and the planar light beams are radiated to the liquid crystal display panel 1.

The control circuit 5 is a circuit which controls an operation of the first drive circuit 2 and an operation of the second drive circuit 3, the brightness of the backlight 4 or the like, and is generally referred to as a TFT controller, a timing controller or the like.

Figure 2A:
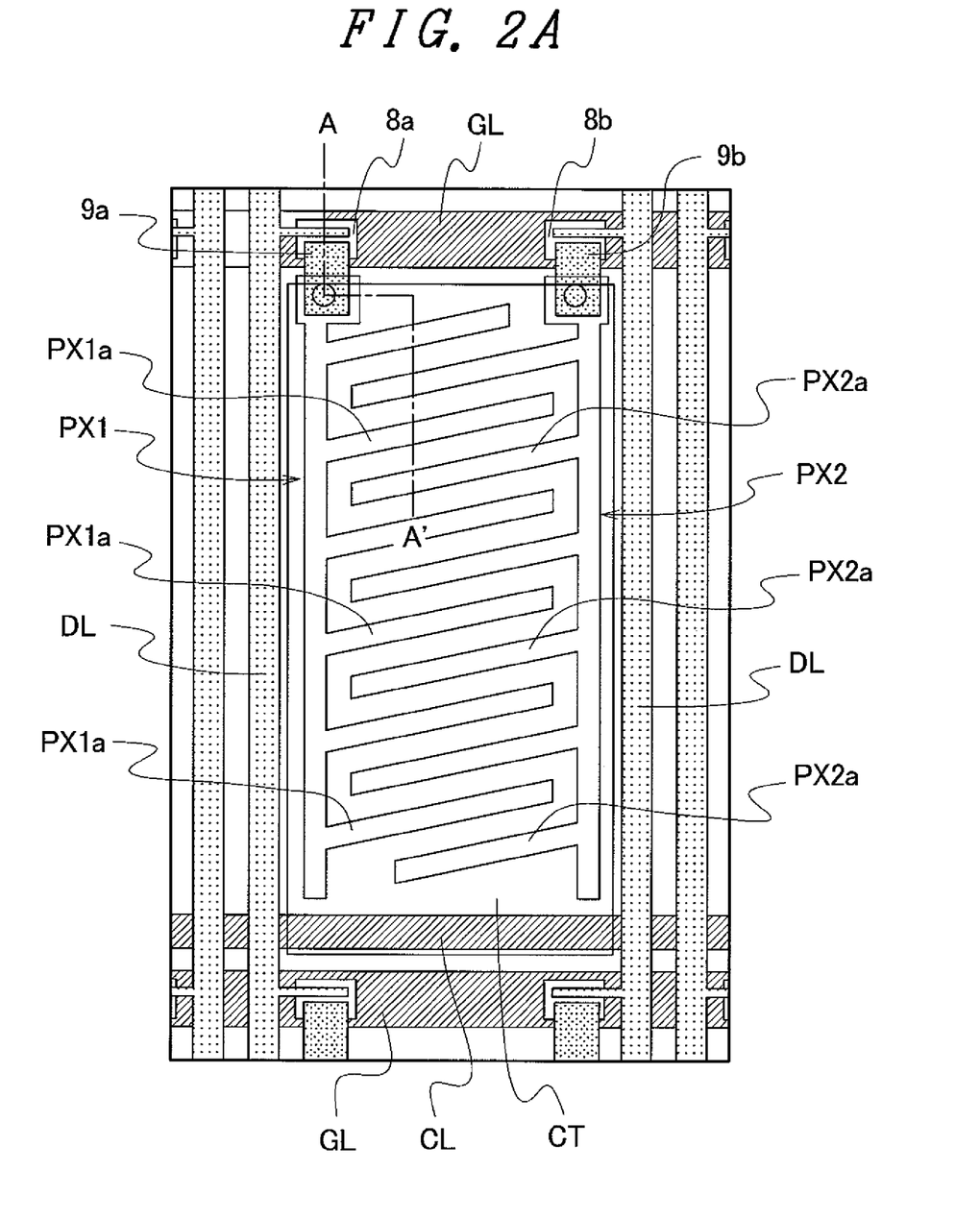
FIG. 2A is a schematic plan view showing one example of the planar constitution of one pixel on a first substrate of the liquid crystal display panel of the embodiment.
Figure 2B:
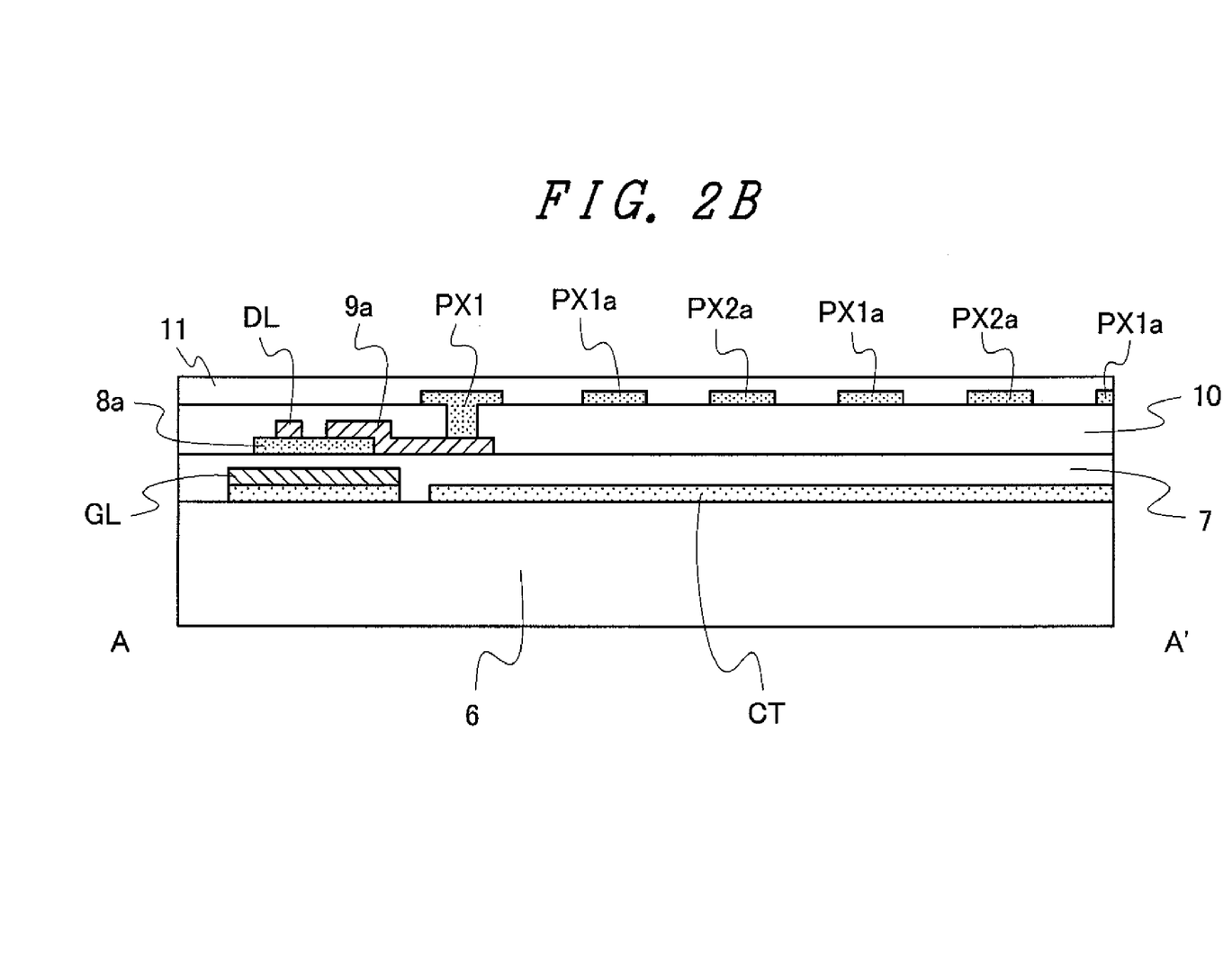
FIG. 2B is a schematic cross-sectional view showing one example of the cross-sectional constitution taken along a line A-A' in FIG. 2A.

FIG. 2A and FIG. 2B are schematic views showing one example of the schematic constitution of one pixel on the first substrate of the liquid crystal display panel of this embodiment.

FIG. 2A is a schematic plan view showing one example of the planar constitution of one pixel formed on the first substrate of the liquid crystal display panel of this embodiment. FIG. 2B is a schematic cross-sectional view showing one example of the cross-sectional constitution taken along a line A-A' in FIG. 2A.

The liquid crystal display panel 1 of this embodiment is an IPS-drive-type (lateral-electric-field-drive-type) liquid crystal display panel in which three kinds of electrodes consisting of the first pixel electrodes PX1, the second pixel electrodes PX2 and the counter electrodes CT shown in FIG. 1B are arranged on the first substrate together with the scanning signal lines GL and the like.

Further, in the liquid crystal display panel 1 of this embodiment, the first pixel electrodes PX1 and the second pixel electrodes PX2 are formed on the same surface of an insulation layer in an opposed manner, and the first and second pixel electrodes PX1, PX2 and the counter electrode CT are arranged in a stacked manner with an insulation layer sandwiched therebetween.

Accordingly, each pixel on the first substrate has the constitution shown in FIG. 2A and FIG. 2B, for example.

First of all, the scanning line GL, the counter electrode CT, the common line CL, and the first insulation layer 7 which covers the scanning signal line GL, the counter electrode CT and the common line CL are formed on a surface of the first substrate 6 such as a glass substrate. The scanning signal line GL and the common line CL are formed by etching a metal film such as an aluminum film, for example. The counter electrode CT is formed by etching a transparent conductive film such as an ITO film or an IZO film, for example. The first insulation layer 7 is formed of a silicon oxide film ($SiO_2$ film), for example.

Here, it is desirable to form the counter electrode CT within the pixel in a rectangular shape, in other words, on the substantially whole surface of a region surrounded by two neighboring scanning signal lines GL and two neighboring video signal lines DL so as to have a rectangular shape.

FIG. 2A and FIG. 2B exemplify a case where a transparent conductive film and a metal film are sequentially formed (film forming), the scanning signal line GL and the common line CL are formed by etching a metal film and, thereafter, the counter electrode CT are formed by etching a transparent conductive film. However, the scanning signal line GL, the counter electrode CT and the common line CL may be formed such that, for example, a transparent conductive film is formed and the formed conductive film is etched so as to form the counter electrode CT and, thereafter, a metal film is formed and the formed metal film is etched so as to form the scanning signal line GL and the common line CL. Further, the scanning signal line GL, the counter electrode CT and the common line CL may be formed such that a metal film is formed and the formed metal film is etched so as to form the scanning signal line GL and the common line CL and, thereafter, a transparent conductive film is formed and the formed conductive film is etched so as form the counter electrode CT. Still further, in place of forming the common line CL, for example, a strip-shaped counter electrode CT which is shared in common by a plurality of pixels arranged along the extending direction of the scanning signal line GL may be formed.

On the first insulation layer 7, a semiconductor layer 8a of the first TFT element Tr1, a semiconductor layer 8b of the second TFT element Tr2, the video signal line DL, a source electrode 9a of the first TFT element Tr1, a source electrode 9b of the second TFT element Tr2, and a second insulation layer 10 which covers the above-mentioned respective components are formed. The semiconductor layer 8a of the first TFT element Tr1 and the semiconductor layer 8b of the second TFT element Tr2 are formed by etching a semiconductor film such as an amorphous silicon (a-Si) film, for example. The video signal line DL, the source electrode 9a of the first TFT element Tr1 and the source electrode 9b of the second TFT element Tr2 are formed by etching a metal film such as an aluminum film, for example. The second insulation layer 10 is formed of a silicon nitride film ($SiN_X$ film), for example. Here, the second insulation layer 10 is not limited to an insulation layer formed of a single material, and may be formed by stacking two or more kinds of insulation films which differ in material.

The drain electrode of the first TFT element Tr1 and the drain electrode of the second TFT element Tr2 are integrally formed with the video signal line DL respectively. Here, contact holes (not shown in the drawing) are formed in the second insulation layer 10 above the source electrodes 9a, 9b.

On the second insulation layer 10, the first pixel electrodes PX1, the second pixel electrodes PX2, and an alignment film 11 which covers the first pixel electrodes PX1 and the second pixel electrodes PX2 are formed. The first pixel electrodes PX1 and the second pixel electrodes PX2 are formed by etching a transparent conductive film such as an ITO film or an IZO film, for example.

Here, the first pixel electrode PX1 is connected to the source electrode 9a via a contact hole (not shown in the drawing) which is formed above the source electrode 9a, and the second pixel electrode PX2 is connected to the source electrode 9b via a contact hole (not shown in the drawing) which is formed above the source electrode 9b. The first pixel electrode PX1 has a planar shape and includes a plurality of comb-teeth portions PX1a, while the second pixel electrode PX2 also has a planar shape and includes a plurality of comb-teeth portions PX2a. The first pixel electrode PX1 and the second pixel electrode PX2 are arranged in an opposed manner such that the plurality of comb-teeth portions PX1a of the first pixel electrode PX1 and the plurality of comb-teeth portions PX2a of the second pixel electrode PX2 are alternately arranged with predetermined gaps (slits). It is preferable to set the gaps (slit) between the plurality of comb-teeth portions PX1a of the first pixel electrode PX1 and the plurality of comb-teeth portions PX2a of the second pixel electrode PX2 equal within the pixel.

Further, the plurality of comb-teeth portions PX1a of the first pixel electrode PX1 and the plurality of comb-teeth portions PX2a of the second pixel electrode PX2 are respectively arranged at positions where the respective comb-teeth portions PX1a, PX2a overlap with the counter electrode CT.

Figure 3A:
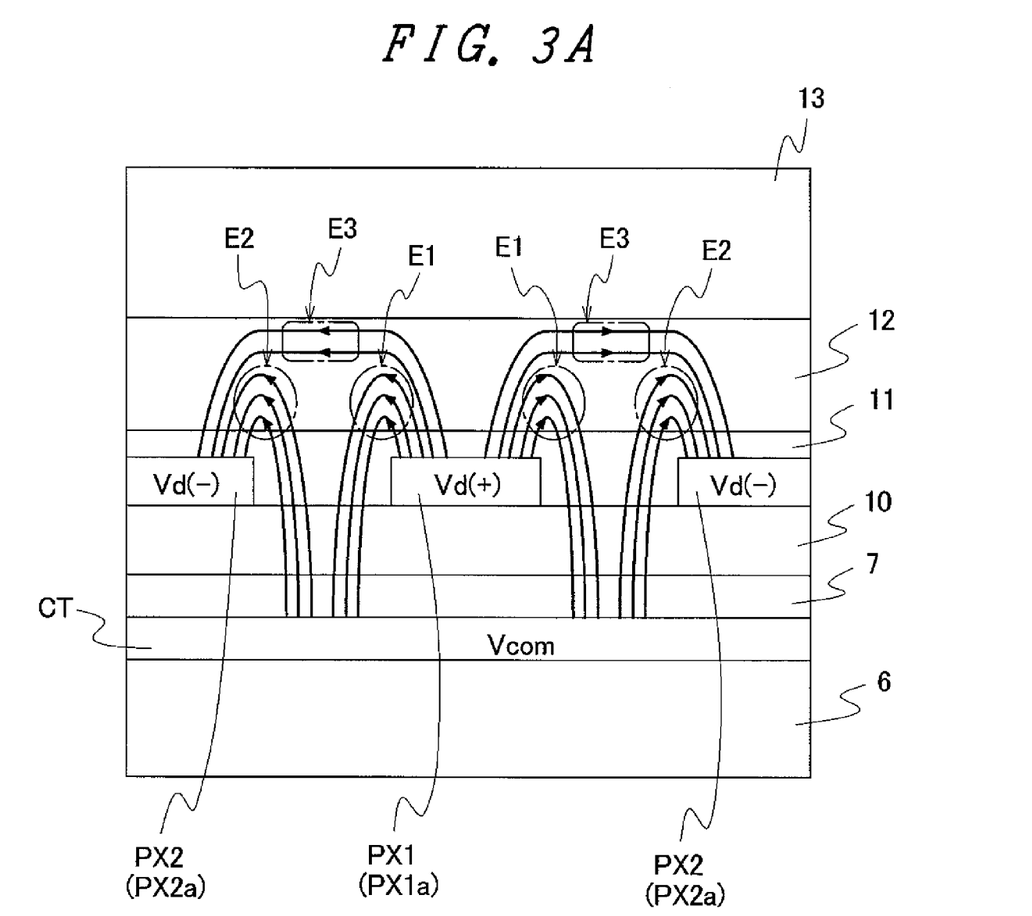
FIG. 3A is a schematic view showing one example of an electric field applied to the liquid crystal display panel of the embodiment.
Figure 3B:
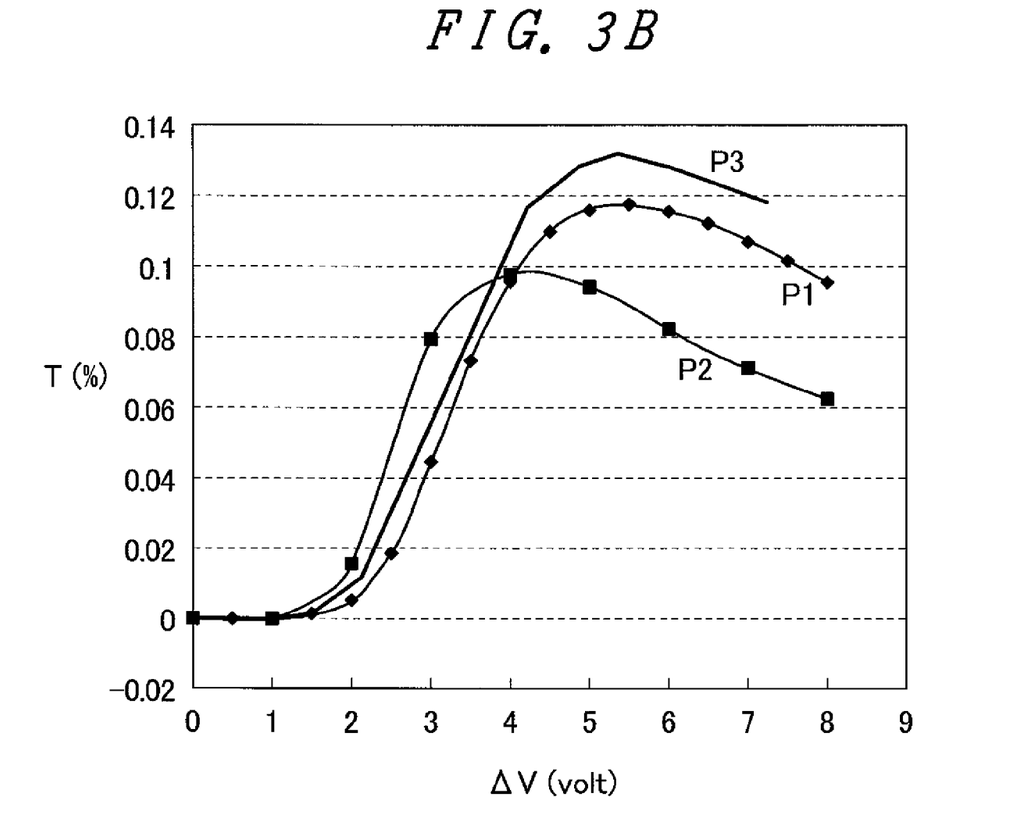
FIG. 3B is a schematic view showing one example of a relationship between potential difference between a pixel electrode and a counter electrode and transmissivity in the liquid crystal display panel of the embodiment.

FIG. 3A and FIG. 3B are schematic views for explaining the manner of operation and advantageous effects of the liquid crystal display panel of this embodiment.

FIG. 3A is a schematic view showing one example of an electric field which is applied to the liquid crystal display panel of this embodiment. FIG. 3B is a schematic view showing one example of the relationship between the potential difference between the pixel electrode and the counter electrode and transmissivity of the liquid crystal display panel of this embodiment.

In case of a conventional IPS-type liquid crystal display panel in which one pixel electrode and one counter electrode are arranged in a stacked manner with an insulation layer sandwiched therebetween (hereinafter, referred to as a conventional stacked-arrangement-type liquid crystal display panel), an electric field which is applied to a liquid crystal material in one pixel is mainly applied to only a portion of the liquid crystal material which is positioned in the vicinity of the first substrate 6 including the pixel electrode. Accordingly, with respect to liquid crystal molecules in the liquid crystal material in one pixel, for example, the liquid crystal molecules positioned in the vicinity of the first substrate 6 are rotated firstly and, then, liquid crystal molecules positioned on a second substrate side are rotated by being influenced by the rotation of the liquid crystal molecules arranged in the vicinity of the first substrate 6.

To the contrary, in driving the liquid crystal display panel 1 of this embodiment, a level relationship between a potential of a grayscale voltage which is applied to the first pixel electrode PX1 and a potential of a common voltage applied to the counter electrode CT in one pixel during 1 frame period, and a level relationship between a potential of a grayscale voltage which is applied to the second pixel electrode PX2 and the potential of the common voltage applied to the counter electrode CT in one pixel during 1 frame period are reversed, for example. Here, as shown in FIG. 3A, for example, an electric field which is applied to a liquid crystal material 12 in one pixel is roughly classified into three kinds of electric fields, that is, a first electric field E1 which is generated due to the potential difference between the first pixel electrode PX1 and the counter electrode CT, a second electric field E2 which is generated due to the potential difference between the second pixel electrode PX2 and the counter electrode CT, and a third electric field E3 which is generated due to the potential difference between the first pixel electrode PX1 and the second pixel electrode PX2.

Here, in FIG. 3A, symbol Vcom indicates a common voltage which is applied to the counter electrode CT, and symbol Vd indicates a grayscale voltage which is applied to the pixel electrodes. Further, a grayscale voltage Vd(+) of the first pixel electrode PX1 indicates that a potential of the grayscale voltage is higher than a potential of the common voltage Vcom, and a grayscale voltage Vd(−) of the second pixel electrode PX2 indicates that a potential of the grayscale voltage is lower than a potential of the common voltage Vcom.

That is, in driving the liquid crystal display panel 1 of this embodiment, it is possible to drive the liquid crystal molecules in the liquid crystal material 12 by also making use of the third electric field E3 which is not generated in driving the conventional stacked-arrangement-type liquid crystal display panel. As shown in FIG. 3A, lines of electric force of the third electric field E3 pass an area outside the first electric field E1 and the second electric field E2, that is, an area in the vicinity of the second substrate 13. Accordingly, in driving the liquid crystal display panel 1 of this embodiment, the liquid crystal molecules positioned in the vicinity of the first substrate 6 are rotated by the first electric field E1 and the second electric field E2, and the liquid crystal molecules positioned in the vicinity of the second substrate 13 are rotated by the third electric field E3.

Here, the potential difference between the first pixel electrode PX1 and the second pixel electrode PX2 is substantially twice as large as the potential difference between the first pixel electrode PX1 and the counter electrode CT and the potential difference between the second pixel electrode PX2 and the counter electrode CT. Accordingly, the intensity of the third electric field E3 is substantially twice as large as the intensity of the first electric field E1 and the intensity of the second electric field E2.

Therefore, it is considerable that, in driving the liquid crystal display panel 1 of this embodiment, even when a maximum value of the potential difference between a drive voltage, that is, a grayscale voltage in performing a grayscale display and a common voltage is lowered, it is possible to maintain the optical transmissivity.

When inventors of the present invention studied the relationship between the potential difference between the pixel electrode and the counter electrode and the optical transmissivity with respect to the conventional IPS-type stacked-arrangement-type liquid crystal display panel in which one TFT element and one pixel electrode are arranged within a pixel and the liquid crystal display panel 1 of this embodiment respectively, a result shown in FIG. 3B is obtained. In a graph shown in FIG. 3B, the potential difference $\Delta V$ (volt) between the pixel electrode and the counter electrode is taken on an axis of abscissas, and the transmissivity T(%) is taken on an axis of ordinates.

Further, in the graph shown in FIG. 3B, characteristic curves P2 and P3 respectively indicate one example of relationship between the potential difference $\Delta V$ between the pixel electrode and the counter electrode and the transmissivity T of the liquid crystal display panel 1 of this embodiment. The difference between characteristic curves P2, P3 lies in the gap between the comb-teeth portions (gaps between slits) of the pixel electrode. The gap is set to 10 μm with respect to the characteristic curve P2 and is set to 15 μm with respect to the characteristic curve P3.

Further, in the graph shown in FIG. 3B, a characteristic curve P1 indicates one example of the relationship between the potential difference $\Delta V$ between the pixel electrode and the counter electrode and the transmissivity T of the conventional stacked-arrangement-type liquid crystal display panel. The counter electrode has the same shape as the counter electrode of this embodiment, and the pixel electrode is an electrode including a plurality of comb-teeth portions and slits.

The relationship between the potential difference $\Delta V$ between the pixel electrode and the counter electrode and the transmissivity T of the conventional stacked-arrangementtype liquid crystal display panel exhibits a change indicated by the characteristic curve P1 in FIG. 3B where the transmissivity T becomes maximum when the potential difference ΔV assumes a value ranging from 5 volt to 6 volt, for example.

On the other hand, in the liquid crystal display panel 1 of this embodiment, when the gap (slit) between the comb-teeth portion PX1a of the first pixel electrode PX1 and the comb-teeth portion PX2a of the second pixel electrode PX2 is set to 10 μm, the relationship between the potential difference ΔV between the pixel electrode and the counter electrode and the transmissivity T exhibits a change indicated by the characteristic curve P2 in FIG. 3B where the transmissivity T becomes maximum when the potential difference ΔV assumes 4 volt, for example.

Here, to compare characteristic curves P1, P2 in a region where the potential difference ΔV is 4 volt or more, the characteristic curve P1, that is, the conventional stacked-arranged liquid crystal display panel exhibits transmissivity T higher than transmissivity T of the liquid crystal display panel 1 of this embodiment. However, when a drive voltage is lowered aiming at the reduction of power consumption of the liquid crystal display device, for example, to estimate a case where a maximum value of the potential difference between the grayscale voltage and the common voltage at the time of performing the grayscale expression is set to 4 volt or less (ΔV<4 volt), the liquid crystal display panel 1 of this embodiment exhibits transmissivity higher than the transmissivity of the conventional stacked-arranged liquid crystal display panel.

Further, in the liquid crystal display panel 1 of this embodiment, the relationship between the potential difference ΔV between the pixel electrode and the counter electrode and the transmissivity T when the gap (slit) between the comb-teeth portion PX1a of the first pixel electrode PX1 and the comb-teeth portion PX2a of the second pixel electrode PX2 is set to 15 μm exhibits a change indicated by a characteristic curve P3 shown in FIG. 3B, for example.

In this example, in the low-voltage region where the potential difference ΔV is 4 volt or less, for example, although the transmissivity T becomes slightly lower than the transmissivity T of the example indicated by the characteristic curve P2, it is possible to maintain the transmissivity T higher than the transmissivity T of the conventional characteristic curve P1. Also in the high-voltage region where the potential difference ΔV is 4 volt or more, the transmissivity T becomes higher than the transmissivity T of the conventional characteristic curve P1.

As can be understood from above, it is safe to say that the liquid crystal display device having the liquid crystal display panel 1 of this embodiment can lower the drive voltage while maintaining the optical transmissivity.

Although the present invention has been specifically explained in conjunction with the embodiment heretofore, it is needless to say that the present invention is not limited to such an embodiment, and various modifications are conceivable without departing from the gist of the present invention.

For example, the numbers and the extending directions of the comb-teeth portions PX1a, PX2a shown in FIG. 2A are merely one example in the liquid crystal display panel 1 of this embodiment respectively, and it is needless to say that the numbers and the extending directions of the comb-teeth portions PX1a, PX2a can be suitably changed. In such a modification, it is desirable that the comb-teeth portions PX1a, PX2a extend in the same direction, and the extending direction is parallel to neither the scanning signal line GL nor the video signal line DL.

Further, the constitution of one pixel shown in FIG. 2A and FIG. 2B is merely one example in the liquid crystal display panel 1 of this embodiment. That is, in the liquid crystal display device of this embodiment (the present invention), it is sufficient that the positional relationship among the first pixel electrode PX1, the second pixel electrode PX2 and the counter electrode CT satisfies the same relationship adopted by the constitution shown in FIG. 2A and FIG. 2B. Accordingly, it is needless to say that the constitution of the first TFT element Tr1 and the second TFT element Tr2 may be suitably changed.

What is claimed is:

1. A liquid crystal display device comprising:
   a liquid crystal display panel which includes a first substrate, a second substrate, and liquid crystal material which is sealed between the first substrate and the second substrate; and
   a plurality of scanning signal lines and a plurality of video signal lines which are arranged on the first substrate, wherein
   pixels, each of which includes a first TFT element, a first pixel electrode which is connected to a source of the first TFT element, a second TFT element, a second pixel electrode which is connected to a source of the second TFT element, and a counter electrode are arranged on the first substrate in a matrix array,
   a drain of the first TFT element and a drain of the second TFT element within the pixel are connected to different ones of the -video signal lines, respectively,
   the first pixel electrode and the second pixel electrode have a planar shape and include a plurality of comb-teeth portions, respectively, and the first pixel electrodes and the second pixel electrodes are arranged alternately on a same layer in an opposed manner with a gap defined between the comb-teeth portion of the first pixel electrode and the comb-teeth portion of the second pixel electrode,
   the first and second pixel electrodes and the counter electrode are arranged in a stacked manner with an insulation layer sandwiched therebetween, and the first pixel electrode and the second pixel electrode are arranged between the counter electrode and the liquid crystal material, and
   wherein a first level relationship between a potential of a grayscale voltage applied to the first pixel electrode and a potential of a voltage applied to the counter electrode during 1 frame period, and a second level relationship between a potential of a grayscale voltage applied to the second pixel electrode and the potential of the voltage applied to the counter electrode during the 1 frame period are reversed relative to one another.

2. A liquid crystal display device according to claim 1, wherein the comb-teeth portions of the first pixel electrode and the comb-teeth portions of the second pixel electrode extend in the same direction, and the extending direction of the comb-teeth portions of the first pixel electrode and the comb-teeth portions of the second pixel electrode are parallel to neither the scanning signal line nor the video signal line.

3. A liquid crystal display device according to claim 1, wherein the counter electrode is formed in a rectangular shape within the pixel covering the substantially whole surface of the pixel.

4. A liquid crystal display device according to claim 1, wherein gaps which are formed between the plurality of comb-teeth portions of the first pixel electrode and the plurality of comb-teeth portions of the second pixel electrode are set equal.

5. A liquid crystal display device according to claim 1, wherein the insulation layer comprises a first insulation layer formed on the counter electrode and a second insulation layer formed on the first insulation layer, and comprised of a different material than the first insulation layer.

6. A liquid crystal display device according to claim 5, wherein the first insulation layer is comprised of silicon oxide and the second insulation layer is comprised of silicon nitride.

7. A liquid crystal display device comprising:
a liquid crystal display panel which includes a first substrate, a second substrate, and liquid crystal material which is sealed between the first substrate and the second substrate; and
a plurality of scanning signal lines and a plurality of video signal lines which are arranged on the first substrate, wherein
pixels, each of which includes a first TFT element, a first pixel electrode which is connected to a source of the first TFT element, a second TFT element, a second pixel electrode which is connected to a source of the second TFT element, and a counter electrode are arranged on the first substrate in a matrix array,
a drain of the first TFT element and a drain of the second TFT element within the pixel are connected to different ones of the video signal lines, respectively,
the first pixel electrode and the second pixel electrode have a planar shape and include a plurality of comb-teeth portions, respectively, and the first pixel electrodes and the second pixel electrodes are arranged alternately on a same layer in an opposed manner with a gap defined between the comb-teeth portion of the first pixel electrode and the comb-teeth portion of the second pixel electrode,
the first and second pixel electrodes and the counter electrode are arranged in a stacked manner with an insulation layer sandwiched therebetween, and the first pixel electrode and the second pixel electrode are arranged between the counter electrode and the liquid crystal material, and
means for generating an electric field due to a potential difference between the first pixel electrode and the second pixel electrode which potential difference is created by providing a first level relationship between a potential of a grayscale voltage applied to the first pixel electrode and a potential of a voltage applied to the counter electrode during 1 frame period, and a second level relationship between a potential of a grayscale voltage applied to the second pixel electrode and the potential of the voltage applied to the counter electrode during the 1 frame period which are reversed relative to one another.

8. A liquid crystal display device according to claim 7, wherein the comb-teeth portions of the first pixel electrode and the comb-teeth portions of the second pixel electrode extend in the same direction, and the extending direction of the comb-teeth portions of the first pixel electrode and the comb-teeth portions of the second pixel electrode are parallel to neither the scanning signal line nor the video signal line.

9. A liquid crystal display device according to claim 7, wherein the counter electrode is formed in a rectangular shape within the pixel covering the substantially whole surface of the pixel.

10. A liquid crystal display device according to claim 7, wherein gaps which are formed between the plurality of comb-teeth portions of the first pixel electrode and the plurality of comb-teeth portions of the second pixel electrode are set equal.

11. A liquid crystal display device according to claim 7, wherein the insulation layer comprises a first insulation layer formed on the counter electrode and a second insulation layer formed on the first insulation layer, and comprised of a different material than the first insulation layer.

12. A liquid crystal display device according to claim 7, wherein the first insulation layer is comprised of silicon oxide and the second insulation layer is comprised of silicon nitride.

* * * * *